United States Patent [19]

Osborne

[11] Patent Number: 4,974,252
[45] Date of Patent: Nov. 27, 1990

[54] INTERACTIVE COMMERCIAL/ENTERTAINMENT NETWORK

[75] Inventor: Joseph A. Osborne, Pompano Beach, Fla.

[73] Assignee: Club Theatre Network, Inc., Pompano Beach, Fla.

[21] Appl. No.: 253,209

[22] Filed: Oct. 4, 1988

Related U.S. Application Data

[63] Continuation of Ser. No. 57,029, Jun. 3, 1987, abandoned.

[51] Int. Cl.⁵ ........................................... H04M 11/00
[52] U.S. Cl. ........................................ 379/92; 379/93; 379/96; 358/84; 358/85; 455/2
[58] Field of Search ...................... 379/91, 92, 93, 96, 379/104, 177, 187, 186, 53, 54, 446, 449, 455; 358/84, 85, 86; 455/2, 4, 5; 381/78, 82; 362/131; 340/667; 297/194

[56] References Cited

U.S. PATENT DOCUMENTS

| | | | |
|---|---|---|---|
| 3,878,322 | 4/1975 | Sullivan | 358/84 |
| 3,909,536 | 9/1975 | Watson et al. | 379/92 |
| 4,360,827 | 11/1982 | Braun | 379/54 |
| 4,512,033 | 4/1985 | Schrock | 358/86 |
| 4,546,382 | 10/1985 | McKenna et al. | 379/92 |
| 4,665,516 | 5/1987 | Middleton et al. | 379/93 |

*Primary Examiner*—Alvin E. Oberley
*Assistant Examiner*—Richard Hjerpe
*Attorney, Agent, or Firm*—Eckert, Seamans, Cherin & Mellott

[57] ABSTRACT

A commerical/entertainment network provides interactive communications for patrons and comprises: a plurality of theaters; a plurality of node/filters, connected in tiers; and, a remote broadcast center. Patrons at respective communication positions in the theaters may individually and successively engage in voice conversations with persons at the remote broadcast center and may collectively originate preference data for processing and subsequent telephone transmission to the broadcast center responsive to an audio/video signal displayed in the theater for simultaneous viewing by all patrons and responsive to broadcast data received and simultaneously routed to each of the communication positions. Each of the theaters may comprise: a plurality of uniquely identifiable communication positions, each having a remotely activatable telephone handset and data input/output panel; a telephone connectable to any one of the handsets; a data processor to reduce data rate downstream transmission requirements; a modem enabling two-way voice and data communication with the remote broadcast center; and, a display for audio/video signals originating from the remote broadcast center. Each of the node/filters may comprise: a data processor to reduce downstream data rate transmission requirements; and, a telephone call selector. The remote broadcast center may comprise: a processor for tabulating output data; a telephone; and, audio/video and data broadcast signal sources.

13 Claims, 4 Drawing Sheets

INTERACTIVE COMMERCIAL/ENTERTAINMENT NETWORK

This is a continuation of application Ser. No. 057,029 filed June 3, 1987, now abandoned.

BACKGROUND OF THE INVENTION

1. Field of the Invention

The invention relates to the field of interactive voice and data communication networks in general, and in particular, to a commercial/entertainment network for interactive communications between patrons in each of a plurality of theaters and a remote broadcast center.

2. Prior Art

Generally speaking, the invention comprises: a network of club-style theaters located remotely from one another and remotely from a central or coordinating broadcast studio; a shared telephone system for such a network; and, a communications position for such a network or telephone system. It is contemplated that attendance at such theatres would not be on the basis of general admission, but would be on the basis of members only, guests of members or by special invitation. Membership might also be associated with membership in sponsoring clubs and other such organizations. A number of individual theaters will be linked by telephone lines to a city or local node/filter. A plurality of city or local node/filters will be linked by telephone lines to a regional node/filter. All of the regional node/filters will be linked by telephone lines to a national or super-regional node/filter, the national or super-regional node/filter being linked by telephone lines to the central studio and to one or more credit card companies. Two-way, interactive communications are provided between the studio and patrons in the various theaters. A parallel communications link is provided by satellite for television communications transmitted from the studio directly to each of the theaters. Data transmitted from patrons in the theaters to the studio is processed in parallel at each tier of node/filters, such data processing significantly reducing the data rate transmission requirements and enabling typical data processing from all theaters to the studio to be completed in a short period of time. Communications from the studio to each of the theaters, and to each of the patrons in the theaters, by the satellite link is simultaneous at each theatre and for each patron. Such timing is very important, as applications such as auctions and surveys require that the patrons or participants receive information from the studio at the very same time, regardless of the location or remoteness of the theatre. Communications in each theatre and at the studio are preferably controlled by respective computers. Each theatre computer is directly linkable to the satellite downlink and is linkable to existing telephone system lines through a modem. In a preferred embodiment of the invention, each theatre is provided with a telephone system having, in effect, only one telephone, but with a large number of telephone handsets, one for each patron or participant. Each patron or participant is also preferably provided with at least two indicator lights and at least two push buttons for registering responses to questions and the like. The telephone handset, indicator lights and push buttons are embodied in a communication position for each patron. Each communication position is preferably remotely controlled through a uniquely coded switch circuit. Access between the single telephone and one or more of the plurality of handsets is controlled through the computer. Such a network enables any individual in any theatre to communicate directly by telephone with a moderator or master of ceremonies in the studio. Data can also be transmitted for simultaneous reception at each theatre by transmission together with the video signal set by means of the satellite link, for example in the blanking intervals of the video signal. Such a network provides the greatest flexibility of the interactive entertainment and communication.

Although some of the following patent references are related to communication networks and interactive communication networks, none discloses or suggests the grand scheme of the invention. The following United States' patent references are believed to be illustrative of the state of the art, and at the same time, illustrative of significant short comings in the prior art and the failure to fully develop and utilize an interactive communication network: 3,752,904—Waterbury; 3,909,536—Watson, et al; 4,008,369—Theurer, et al; 4,071,697—Bushnell, et al; 4,355,372—Johnson, et al; 4,360,827—Braun; 4,368,358—Herschtal; 4,603,232—Kurland, et al; and, 4,630,108—Gomersall.

A particular telephone network taught by Watson, et al is appropriate for what is termed as "incasting", a situation which is defined as being opposite to broadcasting, in that information flows from a plurality of sources to a single sink. The incasting system is of interest only insofar as the incasting is said, generally, to be responsive to radio or television broadcasts. The disclosure is primarily directed to use of a single television and a single telephone in each single home location, although there is some mention that a special incast signal generator circuit be at the seating location of the incaster and there is some suggestion that the system could be wired to simulate the telephone system in a large auditorium, with some or all of the seats representing an incast source.

Braun discloses an interactive audio and video conferencing network, but is concerned almost exclusively with eliminating problems due to the difference in transmission delays between a satellite link (said to be approximately 250 milliseconds) and the telephone system (said to be 10 to 20 milliseconds). The basic solution suggested by Braun is to transmit only a video signal through the satellite link, the audio feed from the studio being transmitted through the telephone network.

Although each of Watson, et al and Braun suggest a network in the very broadest sense wherein remote participants communicate with a central location through telephone lines and satellite links, the commerical/entertainment according to this invention provides a measure of flexibility in application which is neither provided nor appreciated in the prior art. Neither reference anticipates the problem nor suggests solutions which might be associated with data rate transmission requirements for communication networks formulated on a scale apparently incomprehensible to those skilled in the art. With regard to the theaters forming part of the invention, neither reference suggests even the general concept of a plurality of local theaters wherein all patrons in a single theatre have access to single video monitor or projection screen and one of a plurality of telephone handsets linkable to a single telephone, the handsets being remotely activatable together with data input/output means. The use of only one "telephone" in each theatre not only reduces initial equipment costs, but enables the degree of network operating supervision necessary to achieve high efficiency and low operating cost.

The patent to Herschtal discloses circuitry for sharing communications loops in telephone systems, although it appears to require a complete telephone at each location on the loop, rather than merely a handset. The remaining references are believed to be of only general interest.

Insofar as those skilled in the art have sought to utilize existing communication technology, including telephone and satellite systems for voice and data communication, and television or radio broadcasts, those skilled in the art have had only a limited vision of the commercial and entertainment potential of a truly integrated, conveniently interactive communications network which can be substantially implemented with existing communications and switching equipment, which can utilize existing telephone and communications satellites, which can be implemented with considerably less capital expenditure than otherwise thought possible and which can be made to operate with enough speed and efficiency to be on-line and practical. The commercial/entertainment network according to this invention meets all such criteria. Patrons at uniquely identifiable and respective communication positions in the theaters may individually and successively engage in voice conversations with persons at a remote broadcast center and may collectively originate preference data for processing and subsequent telephone transmission to the broadcast center responsive to an audio/video signal displaying in the theatre for simultaneous viewing by all patrons and responsive to broadcast data received and simultaneously routed to each of the communication positions. A plurality of node/filters are operationally disposed in tiers and enable data collection and transmission to proceed from each of the theaters to the broadcast center with significantly reduced data rate transmission requirements.

SUMMARY OF THE INVENTION

It is an object of this invention to provide a commercial/entertainment network for interactive communications between each of a plurality of theaters and a remote broadcast center.

It is another object of this invention to provide a commercial/entertainment network whereby patrons in the theaters may individually and successively engage in voice conversations with persons at the remote broadcast center.

It is still another object of this invention to provide a commercial/entertainment network whereby patrons may collectively originate preference data for processing and subsequent transmission to the broadcast center.

It is yet another object of this invention to provide a commercial/entertainment network whereby such preference data may be responsive to audio/video and/or data displays in the theatre.

It is yet another object of this invention to provide a commercial/entertainment network whereby such audio/video and data signals may be simultaneously viewed or otherwise perceived by all patrons simultaneously.

It is yet another object of this invention to provide a commercial/entertainment theatre forming part of an interactive network of such theaters.

It is yet another object of this invention to provide a commercial/entertainment theatre whereby voice communications may be established by remote control between a patron and a remote location in the network through a shared theatre telephone.

It is yet another object of this invention to provide a commercial/entertainment theatre wherein each patron participates in the network through remotely activatable input/output means for voice and data communications, which means are associated with a uniquely identifiable communication position.

It is yet another object of this invention to provide a communication/entertainment theatre wherein the input/output means for each communication position is controllable by remotely addressable switching means.

It is yet another object of this invention to provide a telephone system wherein a single telephone may be shared by a plurality of users, each user having only a telephone handset or the like.

It is yet another object of this invention to provide such a telephone system which can be embodied in a commercial/entertainment theater forming part of a network of a plurality of such theaters.

It is yet another object of this invention to provide a communication position for a patron in a commercial/entertainment theatre, the theatre forming part of an interactive network of such theaters.

It is yet another object of this invention to provide a communication position providing a patron with access to remotely activatable telephone handset or receiver means, remotely activatable data input means and remotely monitorable data output means.

It is yet another object of this invention to provide a communication position wherein such remotely activatable and monitorable voice and data input/output means are controllable by remotely addressable switching means.

It is yet another object of this invention to provide a communication position which is incorporated into a comfortable arm chair or the like.

These or other objects of the invention are accomplished by a commercial/entertainment network for interactive communications between each of a plurality of theaters and a remote broadcast center, the network comprising: a plurality of theaters, at least one node/filtering means and remote broadcast center. Each of the plurality of theaters may comprise: a plurality of uniquely identifiable communication positions, each position having associated therewith a remotely activatable data input/output means for voice and data communication; a telephone remotely connectable to any number of the remotely activatable input/output means; means for processing output data from the communication positions prior to telephone transmission to reduce data rate transmission requirements and for routing voice and data input signals to and among the communication positions; a modem connected to the telephone and to the data processing means for enabling two-way voice and data communication with the remote broadcast center; and, means for receiving and processing, and when appropriate, displaying audio/video and data broadcast signals originating from the remote broadcast center. The at least one node/filtering means may comprise: means for receiving and processing output data from each of the theaters in a predetermined region to generate a combined data output to reduce combined data output rate transmission requirements; means for selecting a telephone call request directed to the remote broadcast center from all such requests; and, means for transmitting the processed combined output data to the remote broadcast center. The remote broadcast center may comprise: means for receiving the processed combined output data and selected telephone call from the at least one node/filter; means for conducting two-way voice communication with any of the patrons in any of the theaters; signal processing and tabulating means for the combined data output, the signal processing means generating output signals reflecting the data preference selections of all responding patrons in all of the theaters; and, means for generating audio/video and data broadcast signals for transmission to all of said theaters. In such a commercial/entertainment network, patrons at respective communication positions in the theaters may individually and successively engage in voice conversations with persons and the remote broadcast center and may collectively originate preference data for processing and subsequent telephone transmission to the broadcast center responsive to the audio/video signal displayed in the theatre for simultaneous viewing by all patrons and responsive to broadcast data received and simultaneously routed to each of the communication positions.

In an extensive network, the at least one node/filtering means may comprise a plurality of node/filtering means operatively arranged in tiers. Each of a plurality of first node/filtering means may comprise: means for receiving and processing output data from all of the theaters in one of a predetermined number of local regions to generate a combined output data to reduce combined date transmission requirements for downstream transmission; means for selecting a telephone call request directed to the remote broadcast center from theatre from all such requests; and, means for transmitting process combined local output data downstream toward the remote broadcast center. Each of a plurality of second node/filtering means may comprise: means for receiving and processing output data from all of the first node/filtering means in a predetermined number of local regions to generate a combined regional data output to reduce combined data rate transmission requirements for downstream transmission, means for selecting a telephone call request directed to the remote broadcast center from the first node/filtering means from all such requests; and, means for transmitting the process combined regional output data downstream toward the remote broadcast center. At least one third node/filtering means may comprise: means for receiving and processing output data from a predetermined number of the second node/filtering means to generate a combined national or super-regional data output to reduce data transmission requirements downstream toward the remote broadcast center; means for selecting a telephone call request directed to the remote broadcast center from all such requests; and, means for transmitting the processed combined national or super-regional output data downstream toward the remote broadcast center. In those instances where network size dictates that only one third node/filtering means is necessary, the third node/filtering means may be incorporated into or be operatively associated with the remote broadcast center. The at least one third node/filter may also comprise means for communicating with at least one credit center for establishing a patron's credit status and for debiting a patron's credit account during operation of the network.

These and other objects of the invention are also accomplished by a commercial/entertainment network for interactive communications between each of a plurality of theaters and a remote broadcast center, comprising a two-way data and voice telephone communication path and a one-way satellite-linked broadcast signal communication path, enabling simultaneous transmission and perception of displayed data and signals by all patrons in all theaters and enabling parallel processing of preference data generated by all patrons in all theaters.

These and other objects of the invention are also accomplished by a telephone system comprising a communications circuit including a shared telephone; a plurality of communication positions, each communication position having remotely activatable input/output means for voice communications; and, remotely addressable switching means, for each of the positions, coded to uniquely identify the position, for selectively connecting the input/output means to the communications circuit, whereby voice communications may be established by remote control between a system user and a remote location on the network through the shared telephone. The telephone system may be embodied in and form part of a commercial/entertainment theater in a network of such theaters.

These and other objects of the invention are also accomplished by a communication position for a patron in a commercial/entertainment theatre, the theatre forming part of an interactive network of such theaters. The communication position may comprise: a remotely activatable telephone handset or receiver means; a remotely activatable data input means; and remotely monitorable data output means; and, remotely addressable switching means, coded to uniquely identify the position, for operatively connecting telephone handset or receiver means, data input means and the data output means to a data and communications circuit within the theatre.

Further objects and advantages of the invention will be apparent to those skilled in the art from the following detailed description of the preferred embodiments of the invention.

BRIEF DESCRIPTION OF THE DRAWINGS

For the purpose of illustrating the invention, there are shown in the drawings forms which are presently preferred; it being understood, however, that the invention is not limited to the precise arrangements and instrumentalities shown.

DETAILED DESCRIPTION OF THE PREFERRED EMBODIMENTS

Figure 1:
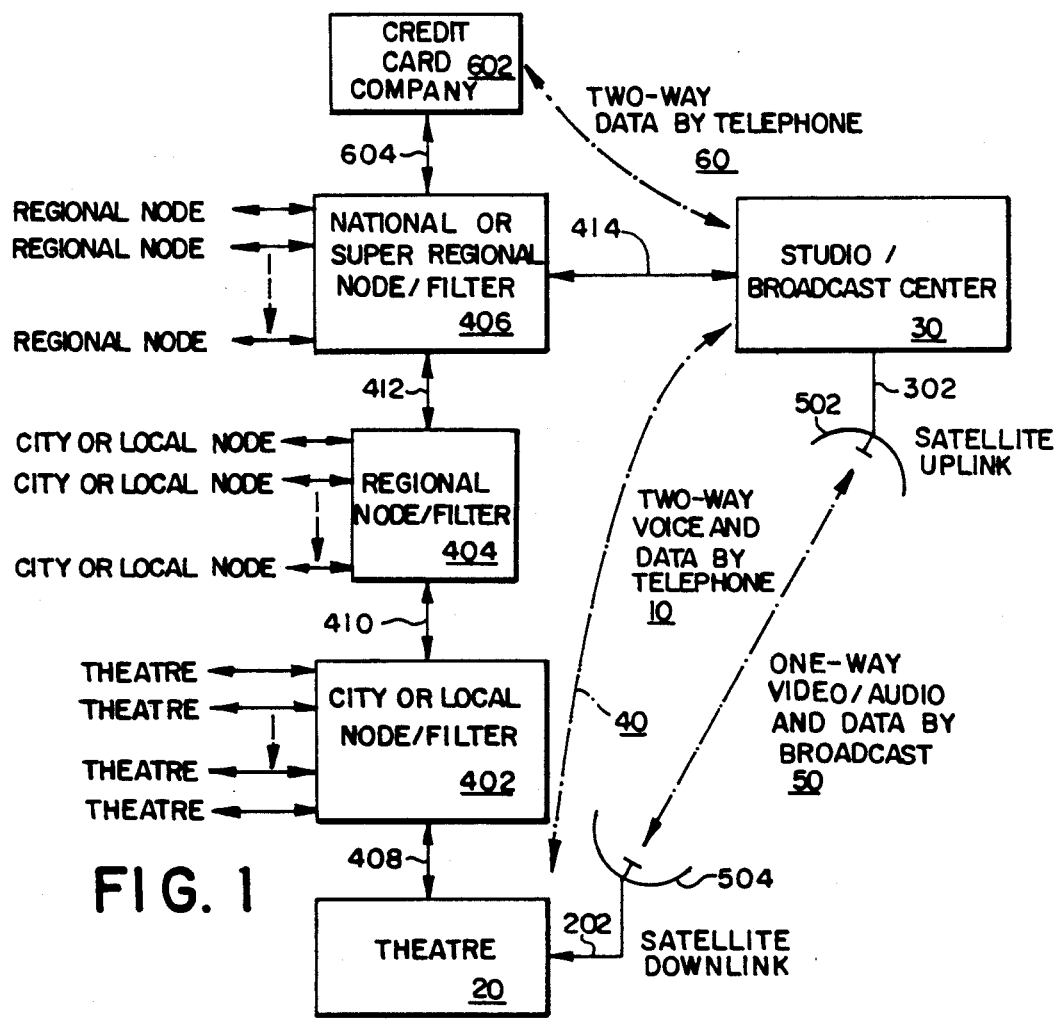
FIG. 1 is a block diagram of a commercial/entertainment network, according to this invention, for interactive communications between each of a plurality of theaters and a remote broadcast center.

A commercial/entertainment network for interactive communications between each of a plurality of theaters and a remote broadcast center is shown in block diagram form in FIG. 1, and generally designated 10. In the illustrated embodiment, the commercial/entertainment network 10 comprises a plurality of theaters 20, a remote studio/broadcast center 30 and a plurality of communication paths. A first communication path 40 incorporates an established telephone system and enables two-way voice communication and data transmission between each of the theaters 20 and the broadcast center 30. A second communication path 50 provides simultaneous, one-way video/audio signal and data transmission from the broadcast center 30 to each of the theaters 20. A third communication path 60 provides two-way data communication between the broadcast center 30 and one or more credit card companies 602. Communication path 40 also provides for two-way data communication between each of the theaters 20 and the credit card companies 602.

In the extensive network 10 shown in FIG. 1, communication path 40 comprises a plurality of node/filtering means operatively disposed in an established telephone system to control data and voice transmissions along communication path 40. The node/filtering means are arranged in tiers, and the number of tiers will ultimately depend upon the number of theaters and the capacity of switching equipment and processing equipment in each node/filter. Decisions as to whether higher efficiency and/or lower cost can be achieved by having smaller numbers of higher capacity node/filtering means or larger numbers of lower capacity node/filtering means is an engineering decision which cannot be made out of context. It is currently contemplated that a reasonable balance is achieved if each of the node/filtering means can accommodate approximately twenty voice/data input lines or signal sources, and generate a single combined voice/data output signal or line forming a single source for a downstream node/filtering means or the broadcast center.

Each theatre 20 is connected to a city or local node/filtering means 402 by a voice/data telephone line 408. Each city of local node/filtering means 402 is connected to a regional node/filtering means 404 by a voice/data telephone line 410. Each regional node/filtering means 404 is connected to a national or super-regional node/filtering means 406 by a voice/data telephone line 412. The national or super-regional node/filtering means 406 is connected to the studio/broadcast center 30 by a voice/data telephone line 414.

Each of the node/filtering means in each of the tiers (402, 404, 406) functions as a parallel data processor for generating a combined data output to reduce combined data output rate transmission requirements downstream toward the broadcast center. Each node/filtering means is also effective to reduce the number of telephone call requests directed to the remote broadcast center from all such requests in all such theaters, or all such requests forwarded by upstream node/filtering means.

Suppose for example that 8000 theaters, each with fifty (50) patrons, were participating in a network. Suppose further that the preference data represented a yes/no vote. Heretofore, it would be necessary to transmit 400,000 separate votes to a tabulating center over 400,000 telephone lines, requiring enormous switchboard capacity and data receiving means. Such an arrangement of theatres is functionally equivalent to 400,000 individual participants, each in his or her own home, using the home telephone. If such a vote were conducted on a network as shown in FIG. 1, each of the theaters need transmit only two "pieces" of information: (1) "yes" or "no"; and, (2) the numerical difference or margin, for example, by "6". Only one telephone line is necessary to transmit this information, and a "typical" node/filtering means handles twenty such lines (and twenty theaters). A first node/filtering means would process data from all of its theaters, and need only transmit two "pieces" of data to a second node/filtering means, "yes" or "no", and the difference or margin. If operating at full capacity (e.g. twenty theaters, each with fifty patrons), the output of one of the first node/filtering means would represent the preference data of 1000 patrons, and would represent such data with only two "pieces" of information. With a full complement of twenty (20) second node/filtering means, each handling twenty (20) first node/filtering means, the output of each second node/filtering means would represent the preference data of 20,000 patrons, and would represent such data with only two "pieces" of information. Finally, if a single third node/filtering means was connected to twenty (20) second node/filtering means, the third node/filtering means would represent the preference data of 400,000 people, and would represent such data with only two "pieces" of information. The average processing and transmission time can be expected to be on the order of only thirty seconds or so. A network according to the invention offers efficiency of enormous proportion.

In a commercial context, for example, an auction, the first patron in each theatre responding can "seize" the shared telephone and initiate a race between all such first responders, through the network and tiers of node/filtering means. The time required for the race would be essentially imperceptible. Bidding might also be conducted on a "group" basis whereby any response from a theatre will keep the theatre "in" the auction. Eventually, as the price increases, theaters will drop out, and first and second node/filtering means will drop out; until only one theatre, and then only one patron in that theatre has been identified as the highest bidder. Bidder indentity might be revealed to all when, for example, only ten bidders remain. Patrons will at all times be able to enter or reenter the bidding, and node/filtering means will become active again, as necessary. In any event, all patrons in all theaters will continue to monitor the auction, through the broadcast signal.

In an entertainment context, a race situation would also accommodate the need to establish voice communications between a "lucky" patron and a celebrity or host at the broadcast center. The network can be easily manipulated by supervisors to assure that patrons with slower reflexes (or indeed, theaters with patrons having slower reflexes) have equal opportunities to reach the broadcast center. The manipulations would, of course, take place without knowledge of the patrons and need not be "unfair" in any sense.

Communication path 50 enables audio/video and data transmission to be simultaneously received at each theatre, and by each patron in each theatre. Such simultaneous reception is a necessity, for example, to assure fairness in commercial/entertainment ventures such as auctions and invitations to converse with famous personalities or influencing a subsequent phase of entertainment. The broadcast center 30 is connected to a satellite uplink transmitting means 502 by an uplink transmission line 302. Each theatre 20 is provided with a satellite downlink receiving means 504 by a downlink transmission line 202. The satellites are not illustrated, and to the extent that relays would be necessary between or among more than one satellite, it would be appropriate to employ equipment necessary to assure simultaneous reception at each theatre.

Communication path 60 is particularly important in the context of auctions or the sale of merchandise from the studio/broadcast center 30 to each of the patrons in all of the theaters 20. The first communication path 40 can be utilized by supervisors in each theatre to assure that each patron has sufficient credit available to enable purchases, and to store this information and/or to transmit this information to a temporary data bank at the studio/broadcast center 30. Thereafter, whenever a patron is a successful bidder in an auction, or has consummated a merchandise purchase, a supervisor at the studio/broadcast center may signal the purchase directly to the credit card company 602, assuring instant debiting of the patron's account and consequent crediting of the merchandiser's account. Automatic running tabulations conducted at either or both the theaters 20 or the studio/broadcast center 30 would assure that no purchases could be made which were not covered by an appropriate credit line or account balance. In other words, merchandising through the network assures instant payment and the absence of accounts receivable.

Figure 2:
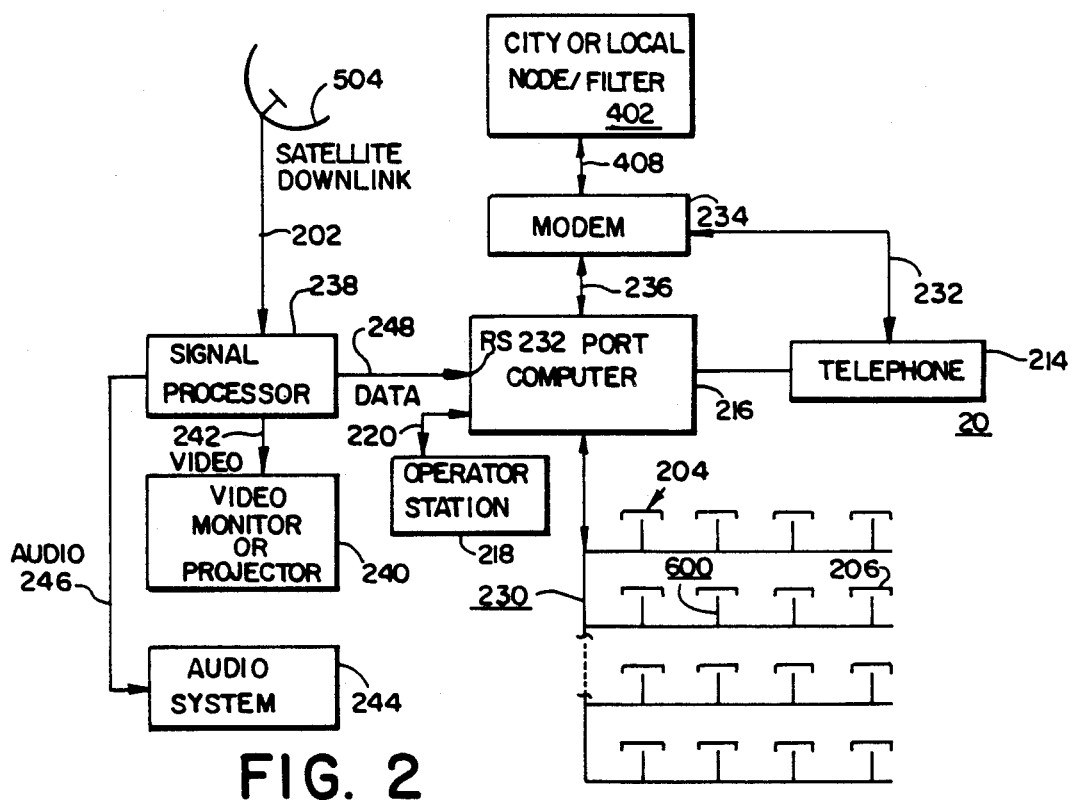
FIG. 2 is a block diagram of a typical theatre forming part of the network shown in FIG. 1 and embodying a shared telephone system.
Figure 4:
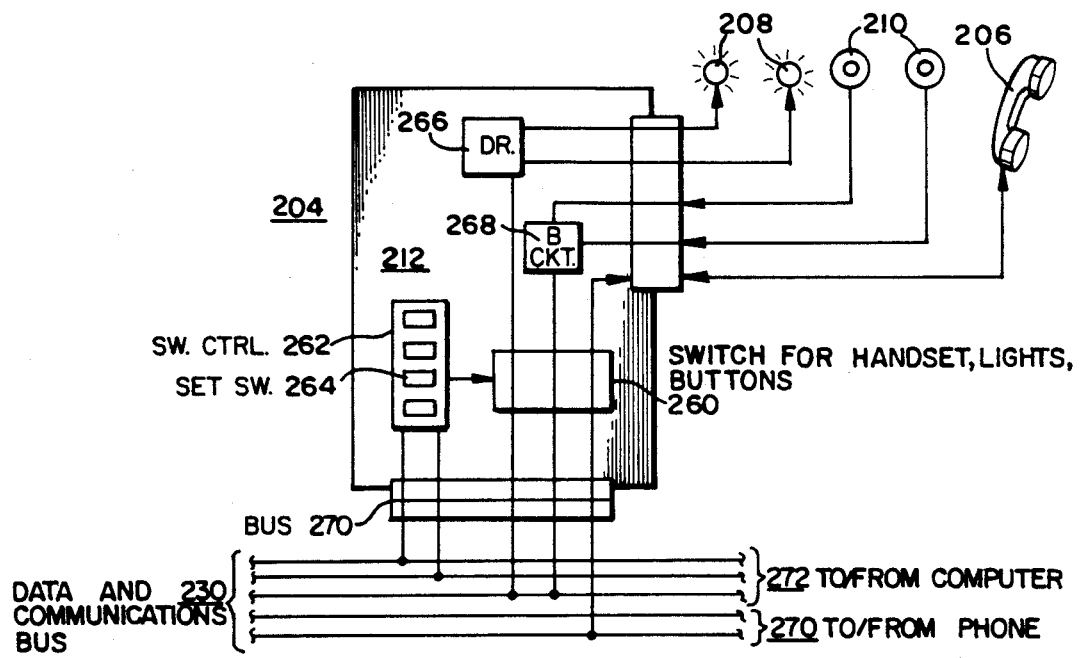
FIG. 4 is a block diagram of a suitable circuit for the communication position forming part of the theatre shown in FIG. 2.

A block diagram illustrating a typical theatre 20 is shown in FIG. 2. Each theatre 20 comprises a plurality of communication positions 204, each communication position having remotely activatable input/output means for voice and data communications. With further reference to FIG. 4, the input/output means for voice communications comprises a telephone handset or receiver means 206. The input/output means for data communications comprises indicator lights 208 and push-buttons 210. The remotely activatable input/output means for each communication position 204 is connected to a data and communications circuit 230, including a shared telephone 214. The input/output means of the communication positions are remotely and selectively connectable to the telephone 214 through line 232, under the control of a computer controller/data processor 216. The computer controller/processor 216 also controls modem 234, enabling telephone 214 to be connected to an established telephone system through line 236 to modem 234, and thereafter, to a city or local node/filtering means 402 by telephone line 408. Audio/video and data broadcast signals originating from the remote broadcast center 30 are received by the satellite downlink means 504 and transmitted to a signal processor 238 by downlink input transmission line 202. Signal processor 238 provides a demultiplexing or dividing function, whereby broadcast data is directed to computer 216 through line 248. The video signal is routed through line 242 to a video monitor or projection system 240. The video display is contemplated to be as large and as of high quality as is commercially available, to be as "movie-like" as possible. The audio signal is routed through line 246 to an audio or speaker system 244, which is preferably a multi-track stereo system of exceptional fidelity. Computer 216 may conveniently be, for example, a personal computer. The various voice and data communication lines can be connected to the computer by typical parallel and serial ports. The computer may also be utilized as a centralized controller for routing data to and from the communication positions 204, over the data and communication system 230, modem line 236 and satellite downlink data line 248. An operator station 218 is associated with computer 216 and connected thereto by control line 220. Other lines representative of the control functions have been omitted for purposes of clarity, as the control of modems, satellite downlink systems, video monitors or projectors and audio systems and the like is known to those skilled in the art.

Figure 3:
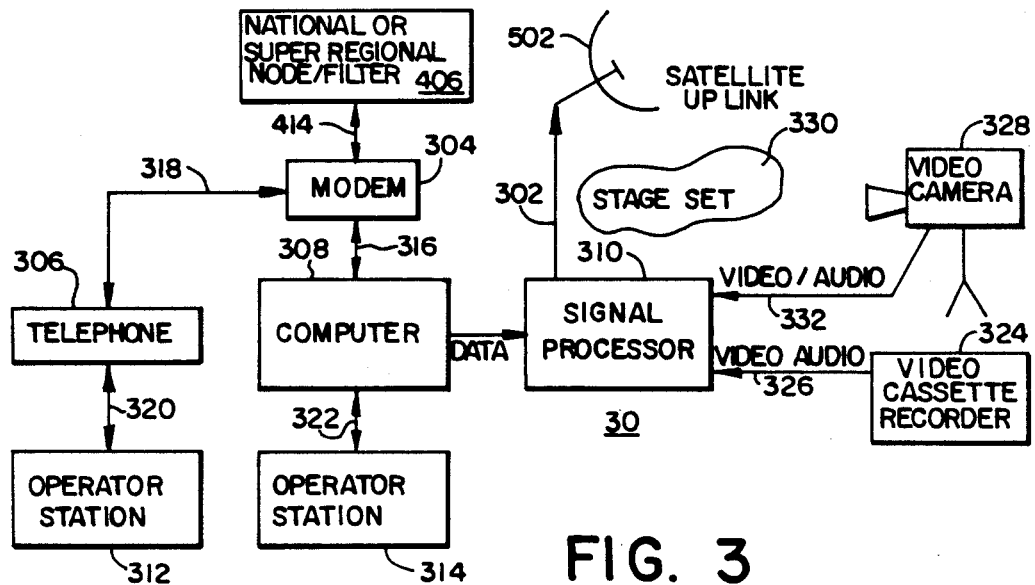
FIG. 3 is a block diagram of a typical studio/broadcast center forming part of the network shown in FIG. 1.

A typical remote broadcast center 30 is shown in block diagram form in FIG. 3. Combined output data from the national or super-regional node/filtering means 406 reaches modem 304 through telephone line 414. The modem 304 is connected to computer controller/processor 308, which may also be a personal computer. The computer 308 routes voice signals to telephone 306 by line 318, telephone 306 being controlled by a first operator station 312 through line 320. Telephone 306 and operator station 312 may comprise telephone switchboard means. The computer 308 is itself controlled by a second operator station 314 and controls data flowing to and from a signal processor 310. The operator stations may be combined. The signal processor 310 receives audio/video signals from a video camera 328 by video camera line 332 or from a video cassette recorder 324 through recorder line 326. The video camera 328 may be used to originate a broadcast signal for a show, auction, sale or the like originating on a stage or set 330. Audio/video signals and data signals from the computer are routed to a satellite uplink means 502 through uplink output line 302, for simultaneous transmission to each of the theaters. The signals may be encrypted to avoid unauthorized access.

FIG. 4 is a block diagram of a circuit suitable for each of the communication positions 204. In the presently preferred embodiment, the input/output means comprises a telephone handset or receiver means 206, two indicator lights 208 and two push-buttons 210. The term "telephone handset or receiver means" is intended to mean that part of a complete telephone set which one normally speaks into and places adjacent one's ear. It is a particular advantage of the invention that only one telephone is needed for each theatre. The term "telephone" is intended to mean that portion of a telephone set which is capable of being connected to a telephone line and that part which enables dialing and the like to take place. It is not necessary that the telephone handset or receiver means 206 be in the form of a hand-held device, and could certainly be of the type sometimes used for radio transceivers which is held on one's head. The particular nature and structure of the indicator lights and push-buttons is also unimportant, and is the specific number of such indicators and monitorable means. The data and communication circuit 230 comprises a telephone line or bus 270 and a set of data lines or bus 272. Indicator lights 208 are driven by a circuit 266 (DR) which is connected to the data bus 272 through remotely activatable switch 260. Push-buttons 210 are controlled by a button circuit 268 (B. CKT.), which is connected to the data bus 272 through switch 260. Telephone handset or receiver means 206 is connected to the phone bus 270 through switch 260. Switch 260 is controlled by an encodeable and remotely activatable switching means 262 (SW CTRL.), which is provided with a plurality of rocker switches 264 (SET SW.) providing a uniquely identifiable code for each communication position. The number of lines in data bus 272 is illustrative and not specific. The data bus 272 will include lines for addressing the remotely activatable and coded switching means 262 as well as lines for activating indicator lights 208 or accepting signals from push buttons 210. The uniquely identifiable code, which can of course be provided by a variety of means in addition to that indicated, enables each telephone handset or receiver means 206 to be individually connected to the shared telephone 214 for both in-coming and out-going telephone communication. The control circuit may be substantially mounted on a circuit board or card which, together with the various switches and control circuits, comprises a position control means 212. A connector 270 is provided for attaching the various circuits of the control position means to the data and telephone buses.

Figure 5:
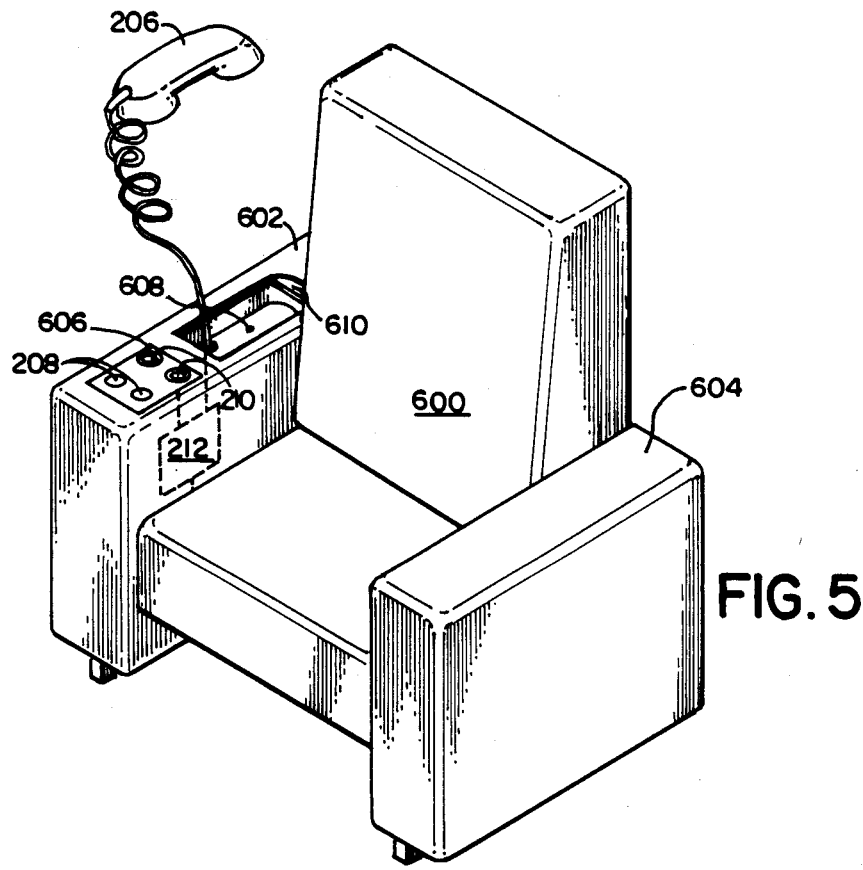
FIG. 5 is a perspective view of an arm chair forming part of the communication position shown in FIG. 2, and housing the circuit and input/output means shown in FIG. 4.

The position control means 212 are preferably incorporated into a comfortable seat or chair 600 as shown in FIG. 5. The chair 600 may be provided with arms 602 and 604, one of which houses the circuit card of the control position means in an interior space. A control panel 606 in which lights 208 and buttons 210 are disposed is mounted on the surface of arm 602 and a receiving cradle or recess 608 is provided for telephone handset or receiver means. The telephone handset or receiver means 206 can be concealed by cover 610. Each of the seats 600 is so arranged in the theatre 20 as to enable each patron to have a clear and unobstructed view of the video monitor or projection means 240.

Figure 6:
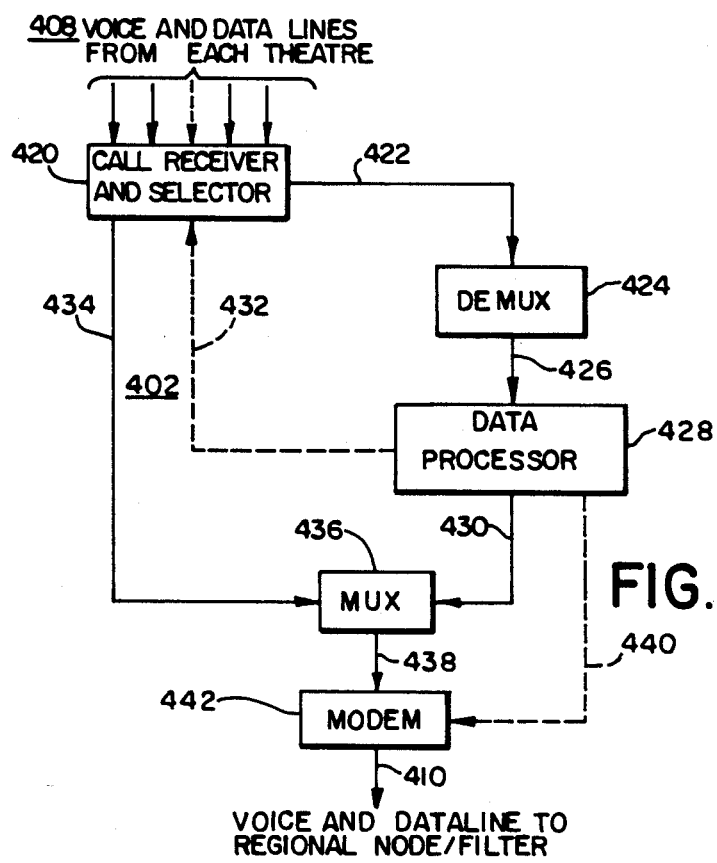
FIG. 6 is a block diagram of a typical city or local node/filtering means forming part of the network shown in FIG. 1.

A typical first node/filtering means 402 is illustrated in FIG. 6. The purpose of each node/filtering means, as described above, is to process all data received from upstream sources and to combine such data into an output having significantly lower data rate transmission requirements. At the same time, each node/filtering means must select one of all incoming phone calls from upstream sources and forward or connect such telephone call through the network toward the remote broadcast center. It is also necessary for each node/filtering means to combine or multiplex the digital data and the voice for transmission downstream to the next tier of node/filtering means or the remote broadcast center as is appropriate. A suitable circuit for the first node/filtering means comprises a telephone call receiver and selector means 420 to which all of the voice and data lines 408 from each theatre 20 in a local area are connected. Telephone call receiver and selector means 420 may embody a switchboard. The telephone call receiver and selector means is controlled by a data processor 428 by control line (shown as a dotted line to distinguish from a communication line) 432. Each telephone call is likely to include data as well as being indicative of a telephone call request. Accordingly, each call must be routed through line 422 to a demultiplexer or decoder 424, the output of which is directed to the data processor 428 through line 426. Data processor 428 accumulates preference data from each of the lines 408, and controls the switching and routing of the various lines 408 through demultiplexer 424. At the same time, telephone call receiver and selector means 420 must select at least one telephone call and place that call on hold after its data has been routed through demultiplexer 424, while all of the other lines 408 are processed. The selection of telephone calls being held can be a random selection for each round of preference data transmission, random selection being made by the data processor. The data processor 428 may be in the form of a personal computer. After all of the lines 408 have been processed, the held telephone call is routed to multiplexer 436 through line 434, where it is combined with the combined data output from the data processor, provided through line 430. The combined voice and data information is sent through line 438 to modem 442, under the control of the data processor by control line 440, providing a voice and data line 410 directed to a regional node/filtering means 404, as shown in FIG. 7.

Figure 7:
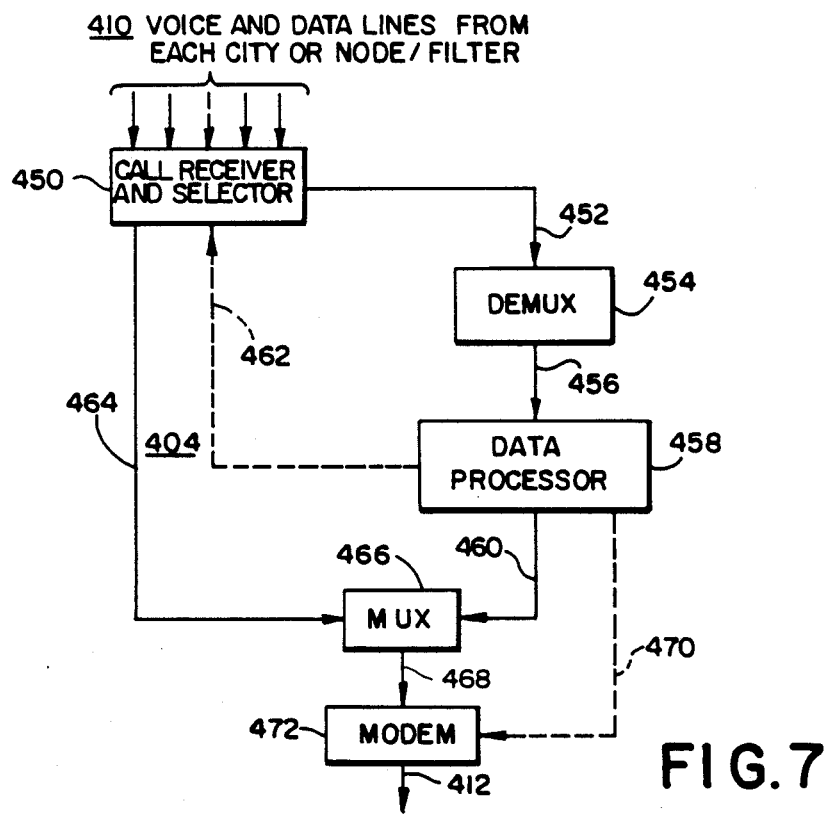
FIG. 7 is a block diagram of a typical regional node/filtering means forming part of the network shown in FIG. 1; and, FIG. 8 is a block diagram of a typical national or super-regional node/filtering means forming part the network shown in FIG. 1.

The operation of the regional node/filtering means shown in FIG. 7 is identical in virtually every respect to the node/filtering means shown in FIG. 6. The regional node/filtering means 404 has a telephone call receiver and selector means 450 connected to each of the voice and data lines 410 from one city on local node/filtering means 402. Data is routed to the data processor 458 through line 452, demultiplexer 454 and line 456; the data processor controlling the telephone call receiver and selector means 450 through control line 462. The combined data output is supplied to multiplexer 466 through line 460, which combines the digital data with the voice signal routed through line 464, the combined voice and signal information reaching modem 472 through line 468, the modem being controlled through line 470. The combined output forms a voice and data line 412 directed to a national or super-regional node/filter.

Figure 8:
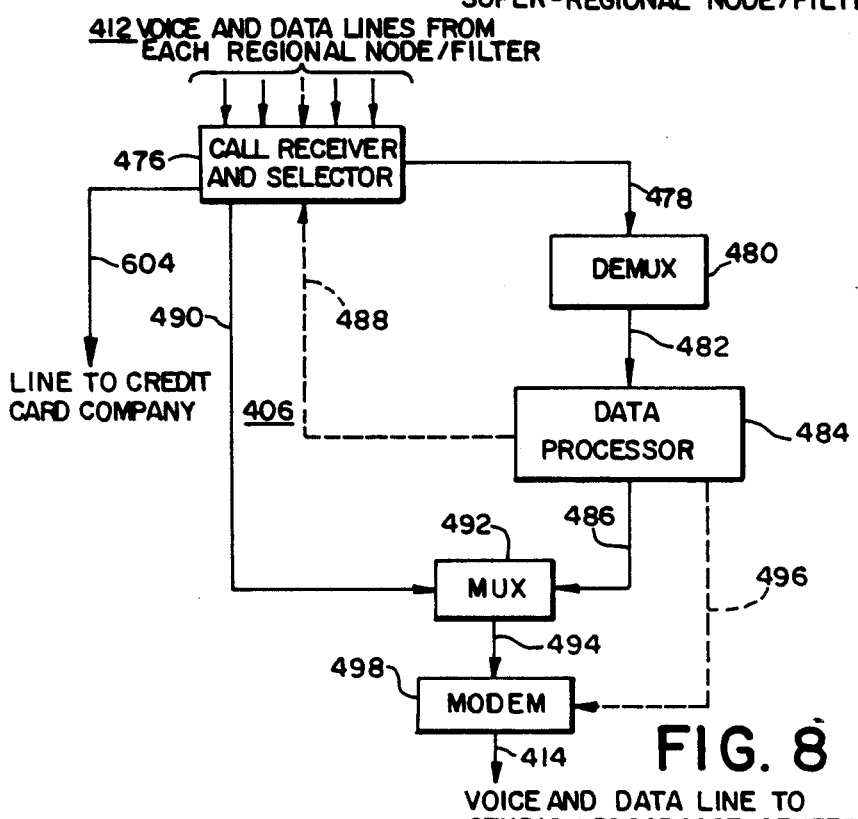

A national or super-regional node-filtering means 406 is shown in FIG. 8. The operation of the node/filtering means 406 is substantially identical to that of the node/filtering means shown in FIGS. 6 and 7, except for telephone line 604 forming part of the two-way data communication path 60 to the at least one credit card company 602. Telephone calls to and from the credit card companies cannot be filtered or selected, and must be held as necessary until all are processed and acknowledged. Otherwise, the node/filtering means 406 comprises a telephone call receiver and selector means 476 connected to a demultiplexer 480 by line 478 and to multiplexer 492 through line 490; the telephone call receiver and selector means 476 being controlled by data processor 484 through control line 488. Data reaches data processor 484 from demultiplexer 480 by line 482, and is combined with the voice signal in the multiplexer after being routed through line 486. The combined signals reach modem 498 through line 494 and are outputted as a voice and data line 414 directed to the studio/broadcast center. The modem is under the control of the data processor 484 by control line 496.

It is not necesary that each node/filtering means hold and forward only one telephone call, and it is contemplated that the node/filtering means will be controllable or programmed to hold and forward larger numbers of calls when desired.

In a broad systems sense, the invention may be thought of as a commercial/entertainment network for interactive communications, comprising: a plurality of theatres, each having means for substantially simultaneously displaying to all patrons, in all of the theatres, broadcast signals originating from a remote source and means, including for example a shared telephone system, enabling the patrons to originate preference data and voice signals responsive to the displayed broadcast signals; a broadcast center remote from the theatres for originating the broadcast signals transmitted to all of the theatres; and, a plurality of node/filtering means operatively disposed in a telephone communication system and connected in cascaded tiers of decreasing number from the theatres to the broadcast center, each of the node/filtering means processing in parallel all data received from upstream sources to reduce data rate transmission requirements downstream and to reduce the number of voice signals forwarded downstream, whereby patrons in the theatres may individually and successively engage in voice communications with persons at the broadcast center and may originate preference data for processing and transmission to the broadcast center responsive to the broadcast signals, displayed for simultaneous perception by all patrons.

The invention is appropriate even for small numbers of theatres, which might eventually be incorporated into a larger network. Such a commercial/entertainment network for interactive communications may comprise: at least two theatres, each having means for substantially simultaneously displaying to all patrons, in all of the theatres, broadcast signals originating from a remote source and means enabling the patrons to originate preference data and voice signals responsive to the displayed broadcast signals; a broadcast center remote from the theatres for originating the broadcast signals transmitted to all of the theatres; and, at least one node/filtering means operatively disposed in a telephone communication system, the at least one node/filtering means processing all data received from upstream sources to reduce data rate transmission requirements downstream and to reduce the number of voice signals forwarded downstream, whereby patrons in the theatres may individually and successively engage in voice communications with persons at the broadcast center and may originate preference data for processing and transmission to the broadcast center responsive to the broadcast signals, displayed for simultaneous perception by all patrons. Even in such a small network, substantial savings and efficiencies could be achieved if each of the theatres further comprises: a plurality of uniquely identifiable communication positions, each having remotely activatable input/output means for voice and data communications; a shared patron's telephone; and, means for remotely connecting selected ones of the input/output means to the telephone.

It will be appreciated by those skilled in the art that the entertainment/communication network described herein can be embodied with a wide variety of communication, transmission and computer equipment available on the market. It is a particular advantage of the commercial/entertainment network according to this invention that such interactive communication is enabled without the need or expense to develop new equipment specifically designed for the purpose. It is, of course, useful to develop certain computer programs for controlling each of the personal computers in the theaters, the node/filtering means and broadcast center, so as to operate the network in an efficient and business-like manner, particularly with regard to controlling and coordinating financial transactions.

The invention may be embodied in other specific forms without departing from the spirit of essential attributes thereof, and accordingly, reference should be made to the appended claims, rather than to the foregoing specification, as indicating the scope of the invention.

What is claimed is:

1. A commercial/entertainment network for interactive communications, comprising:
   a plurality of theatres, each having means for substantially simultaneously displaying to all patrons, in all of the theatres, broadcast signals originating from a remote source and means enabling the patron to originate preference data and voice signals responsive to the displayed broadcast signals;
   a broadcast center remote from the theatres for originating the broadcast signals transmitted to all of the theatres; and,
   a plurality of node/filtering means operatively disposed in a telephone communication system, said plurality of the node/filtering means connected in cascaded tiers of decreasing number from the theatres to the broadcast center, the node/filtering means processing in parallel all data received from upstream sources to reduce data rate transmission requirements downstream and to reduce the number of voice signals forwarded downstream,
   whereby patrons in the theatres may individually and successively engage in voice communications with persons at the broadcast center and may originate preference data for processing and transmission to the broadcast center responsive to the broadcast signals, displayed for simultaneous perception by all patrons.

2. The commercial/entertainment network of claim 1, wherein each of the theatres further comprises:
   a plurality of uniquely identifiable communication positions, each having remotely activatable input/output means for voice and data communications as part of said means enabling the patrons to originate preference data and voice signals;
   a shared patron's telephone; and,
   means for remotely connecting selected ones of the input/output means to the shared telephone.

3. A commercial/entertainment network for interactive communications between each of a plurality of theaters and a remote broadcast center, the network comprising:
   a plurality of theaters, each of the theaters comprising:
      a plurality of uniquely identifiable communication positions, each position having associated therewith a remotely activatable data input/output means for voice and data communications;
      a telephone coupled to any number of the remotely activatable input/output means;
      means for processing output data from the communication positions prior to telephone transmission to reduce data rate transmission requirements and for routing voice and data input signals to and among the communication positions;
      a modem connected to the telephone and to the data processing means for enabling two-way voice and data communication with a remote broadcast center; and,
      means for receiving and processing, and selectively displaying audio/video and data broadcast signals originating from the remote broadcast center;
   at least one node/filtering means, comprising:
      means for receiving and processing output data from each of the theaters in a predetermined region to generate a combined data output to reduce combined data output rate transmission requirements;

means for selecting a telephone call request directed to the remote broadcast center from all such request; and, means for transmitting the processed combined output data to the remote broadcast center, and, a remote broadcast center, comprising:

means for receiving the processed combined output data and selected telephone call from the at least one node/filter;

means for conducting two-way voice communication with any of the patrons at a respective communication position in any of the theaters;

signal processing and tabulating means for the combined data output, the signal processing means generating output signals reflecting the data preference selections of all responding patrons in all of the theaters; and, means for generating audio/video and data broadcast signals for transmission to all of said theaters, whereby patrons at respective communication positions in the theaters may individually and successively engage in voice conversations with persons at the remote broadcast center and may collectively originate preference data for processing and subsequent telephone transmission to the broadcast center responsive to the audio/video signal displayed in the theatre for simultaneous viewing by all patrons and responsive to broadcast data received and simultaneously routed to each of the communication positions.

4. A commercial/entertainment network according to claim 3, wherein the at least one node/filtering means comprises:

a plurality of first node/filters, each comprising:

means for receiving and processing output data from all of the theaters in one of a predetermined number of local regions to generate a combined output data to reduce combined data transmission requirements for downstream transmission;

means for selecting a telephone call request directed to the remote broadcast center from each theatre from all such requests; and, means for transmitting the processed combined local output data downstream toward the remote broadcast center;

a plurality of second node/filters, each comprising:

means for receiving and processing output data from all of the first node/filters in a predetermined number of local regions to generate a combined regional data output to reduce combined data rate transmission requirements for downstream transmission;

means for selecting a telephone call request directed to the remote broadcast center from the first node/filters from all such requests; and, means for transmitting the processed combined regional output data downstream toward the remote broadcast center; and, at least one third node/filter, comprising:

means for receiving and processing output data from a predetermined number of the second node/filters to generate a combined super-regional data output to reduce data transmission requirements downstream toward the remote broadcast center;

means for selecting a telephone call request directed to the remote broadcast center from all such request; and, means for transmitting the processed combined super-regional output data downstream toward the remote broadcast center.

5. The commercial/entertainment network of claim 4, wherein the at least one third node/filter is a final node/filter, receiving telephone call requests and combined regional data outputs from all of the second node/filters.

6. The commercial/entertainment network of claim 5, wherein the final node/filter comprises means for communicating with at least one credit center for establishing a patron's credit status and for debiting a patron's credit account during operation of the network.

7. The commercial/entertainment network of claim 3, further comprising:

uplink means for establishing communication from the broadcast center to at least one communications satellite; and, downlink means for each theatre for establishing communication from the at least one communications satellite to each theatre, whereby signals broadcast from the broadcast center are simultaneously received at each theatre, enabling each patron in each theatre to receive the audio/video and data broadcast signals and display the same at the same time irrespective of theatre location.

8. A commercial/entertainment theatre forming part of an interactive network of such theatres, the theatre comprising:

a data and communications circuit including a shared telephone;

a plurality of communication positions, each communication position having remotely activatable input/output means for voice and data communications;

remotely addressable switching means, for each of the positions, coded to uniquely identify the position, for selectively connecting the input/output means to the data and communications circuit; and, means for displaying audio/video signals broadcast simultaneously to each theatre in the network from a remote broadcast center, whereby voice communications may be established between a patron at a respective communication position in the theatre and a person at the remote broadcast center through the shared theatre telephone and whereby a patron may originate preference data for processing and subsequent transmission to the broadcast center responsive to broadcast signals originating from the remote broadcast center.

9. The commercial/entertainment theatre of claim 8, wherein each of the remotely activatable input/output means comprises:

a remotely activatable telephone handset means;

a remotely activatable data input means; and, a remotely monitorable data output means.

10. The commercial/entertainment theatre of claim 9, wherein:

the data output means comprises manually operable switch means; and, the data input means comprises illuminated display means.

11. The commercial/entertainment theatre of claim 8, further comprising a control position for all of the communication positions, the control position comprising:
   means for controlling the audio/video signal displaying means;
   means for processing output data from all of the input/output means to generate a combined theatre data output;
   means for selectively connecting the shared telephone to any selected one of the input/output means; and,
   means for establishing telephone communication between the theatre and a remote location on the network, for enabling two-way voice communication and combined data output transmission.

12. The commercial/entertainment theatre of claim 8, wherein each of the communication positions comprises means forming a seat for a patron, the input/output means being at least partly mounted in and on the seat means, each of the seats being so disposed to enable patrons to simultaneously view the displayed audio/video signal.

13. A commercial/entertainment theatre for interactive communications with a remote broadcast center, the theatre comprising:
   a plurality of uniquely identifiable communication positions, each position having associated therewith a remotely activatable input/output means for voice and data communications;
   a telephone coupled to any number of the remotely activatable input/output means;
   means for processing output data from the communication positions prior to telephone transmission to reduce data rate transmission requirements and for routing voice and data input signals to and among the communication positions;
   a modem connected to the telephone and to the data processing means for enabling two-way voice and data communication with a remote broadcast center; and,
   means for receiving and processing, and selectively, displaying audio/video and data broadcast signals originating from the remote broadcast center,
   whereby patrons at respective communication positions in the theatre may individually and successively engage in voice conversations with persons at the remote broadcast center and may simultaneously originate preference data for processing and subsequent telephone transmission to the broadcast center responsive to the audio/video signal displayed in the theatre for simultaneous viewing by all patrons and responsive to broadcast data received and simultaneously routed to each of the communication positions.

* * * * *